(12) United States Patent
Kajikawa et al.

(10) Patent No.: US 6,716,894 B2
(45) Date of Patent: Apr. 6, 2004

(54) WATER-ABSORBENT RESIN POWDER AND ITS PRODUCTION PROCESS AND USES

(75) Inventors: Katsuhiro Kajikawa, Himeji (JP); Toru Nishioka, Himeji (JP); Hirotama Fujimaru, Himeji (JP); Kunihiko Ishizaki, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 56 days.

(21) Appl. No.: 10/187,959

(22) Filed: Jul. 3, 2002

(65) Prior Publication Data

US 2003/0087983 A1 May 8, 2003

(30) Foreign Application Priority Data

Jul. 6, 2001 (JP) ........................................ 2001-206548

(51) Int. Cl.[7] ............................. C08F 2/46; A61E 13/15
(52) U.S. Cl. ....................... 522/150; 522/104; 522/107; 522/149; 522/153; 521/56; 524/906; 526/317.1; 526/318; 526/319; 526/930; 428/402; 428/913; 428/500; 604/367; 604/372
(58) Field of Search ............................ 522/6, 104, 107, 522/149, 150, 153; 521/56; 524/906; 526/317.1, 318, 319, 930; 428/402, 913, 500; 604/367, 372

(56) References Cited

U.S. PATENT DOCUMENTS

| | | | |
|---|---|---|---|
| 4,093,776 A | 6/1978 | Aoki et al. | |
| 4,286,082 A | 8/1981 | Tsubakimoto et al. | |
| 4,367,323 A | 1/1983 | Kitamura et al. | |
| 4,446,261 A | 5/1984 | Yamasaki et al. | |
| 4,497,930 A | 2/1985 | Yamasaki et al. | |
| 4,541,871 A | 9/1985 | Obayashi et al. | |
| 4,625,001 A | 11/1986 | Tsubakimoto et al. | |
| 4,666,983 A | 5/1987 | Tsubakimoto et al. | |
| 4,683,274 A | 7/1987 | Nakamura et al. | |
| 4,734,478 A | 3/1988 | Tsubakimoto et al. | |
| 4,863,989 A | 9/1989 | Obayashi et al. | |
| 4,873,299 A | 10/1989 | Nowakowsky et al. | |
| 4,959,060 A | 9/1990 | Shimomura et al. | |
| 4,973,632 A | 11/1990 | Nagasuna et al. | |
| 4,985,518 A | 1/1991 | Alexander et al. | |
| 5,124,416 A | 6/1992 | Haruna et al. | |
| 5,145,906 A | 9/1992 | Chambers et al. | |
| 5,244,735 A | 9/1993 | Kimura et al. | |
| 5,264,495 A | 11/1993 | Irie et al. | |
| 5,380,808 A | 1/1995 | Sumiya et al. | |
| 5,849,405 A | 12/1998 | Wang et al. | |
| 6,228,930 B1 | 5/2001 | Dairoku et al. | |
| 6,291,636 B1 | 9/2001 | Miyake et al. | |
| 6,335,406 B1 | 1/2002 | Nagasuna et al. | |
| 6,388,000 B1 | 5/2002 | Irie et al. | |

FOREIGN PATENT DOCUMENTS

| | | |
|---|---|---|
| EP | 0 629 411 A1 | 6/1994 |
| EP | 0 811 636 A1 | 12/1997 |
| EP | 0 844 270 A1 | 5/1998 |
| EP | 0 855 232 A2 | 7/1998 |
| EP | 0 922 717 A1 | 6/1999 |
| EP | 0 942 014 A2 | 9/1999 |
| EP | 0 955 086 A2 | 11/1999 |
| EP | 1 097 946 A2 | 5/2001 |
| EP | 1 118 633 A2 | 7/2001 |
| EP | 1 130 045 A2 | 9/2001 |
| JP | 47-17604 | 9/1972 |
| JP | 57-44627 | 3/1982 |
| JP | 58-42602 | 3/1983 |
| JP | 58-180233 | 10/1983 |
| JP | 59-62665 | 4/1984 |
| JP | 60-18690 | 5/1985 |
| JP | 61-5914 | 1/1986 |
| JP | 61-16903 | 1/1986 |
| JP | 63-118375 | 5/1988 |
| JP | 63-127754 | 5/1988 |
| JP | 63-153060 | 6/1988 |
| JP | 63-272349 | 11/1988 |
| JP | 64-33158 | 2/1989 |
| JP | 2-255804 | 10/1990 |
| JP | 3-179008 | 8/1991 |
| JP | 4-246403 | 9/1992 |
| JP | 5-97929 | 4/1993 |
| JP | 9-509591 | 9/1997 |
| JP | 10-202187 | 8/1998 |
| JP | 10-204184 | 8/1998 |
| JP | 2001-253962 | 9/2001 |
| WO | WO 01/38402 A1 | 5/2001 |

Primary Examiner—James J. Seidleck
Assistant Examiner—Sanza L. McClendon
(74) Attorney, Agent, or Firm—Roylance, Abrams, Berdo & Goodman, L.L.P.

(57) ABSTRACT

The present invention provides: a water-absorbent resin powder, which includes no fine metallic foreign substance, and in which the deterioration is suppressed; its production process; and uses. The present invention production process for a water-absorbent resin powder comprises the steps of: polymerizing an unsaturated monomer; and drying the resultant crosslinked hydrogel polymer, wherein the water-absorbent resin powder has a crosslinked structure and a mass-average particle diameter of 300 to 600 μm wherein the ratio of fine particles having particle diameters of not larger than 150 μm is less than 10 mass % of the water-absorbent resin powder, with the production process being characterized by further comprising a magnetic-flux irradiation step of passing a magnetic field having a magnetic flux density of not less than 0.05 Wb/m² through the water-absorbent resin powder after the drying step in the production process.

16 Claims, 5 Drawing Sheets

WATER-ABSORBENT RESIN POWDER AND ITS PRODUCTION PROCESS AND USES

BACKGROUND OF THE INVENTION

A. Technical Field

The present invention relates to a water-absorbent resin powder and its production process and uses.

B. Background Art

Water-absorbent resins are used as absorbing agents for sanitary materials, such as sanitary napkins and disposable diapers. In addition, they have wide uses (e.g. they are used as such as water-retaining agents and dehydrating agents in agricultural and horticultural fields and engineering works fields).

Although not especially limited to the above-exemplified uses, it is needless to say that the water absorption performance of the water-absorbent resins must not be deteriorated with the passage of time.

As to devices to inhibit the deterioration of the water absorption performance, known examples of methods for inhibiting the water-absorbent resins from being deteriorated due to urine with the passage of time include counter-methods as described in such as JP-A-118375/1988, U.S. Pat. Nos. 4,972,019, 4,863,989, JP-A-127754/1988, JP-A-153060/1988, JP-A-272349/1988, JP-A-033158/1989, JP-A-255804/1990, JP-A-179008/1991, EP 0372981, and JP-A-097929/1993.

However, on the present inventors' investigations, it has been found that the deterioration of the water absorption performance is caused even if these conventional counter-methods are carried out.

SUMMARY OF THE INVENTION

A. Object of the Invention

Accordingly, an object of the present invention is: to search for the hitherto unknown cause of the above deterioration of the water absorption performance; and then to try its prevention.

B. Disclosure of the Invention

The present inventors diligently studied to solve the above-mentioned problems. As a result, they have found out that a water-absorbent resin includes a trace of metallic foreign substance. Particularly, they have found that: when the water-absorbent resin is divided into small particles in order to enhance the performance of the water-absorbent resin and besides, the fine-powder content is lowered by narrowing the particle diameter distribution, then the content of the above metallic foreign substance increases, with the result that the metallic foreign substance as contained in a trace promotes the deterioration of the water absorption performance of the water-absorbent resin. Specifically, the present inventors have found out that: the above deterioration is particularly easily caused when an attempt is made for the water-absorbent resin powder to have a mass-average particle diameter of 300 to 600 μm and for the ratio of fine particles having particle diameters of not larger than 150 μm to decrease to less than 10 mass % of the water-absorbent resin powder so that the performance of the water-absorbent resin can be enhanced; and the more the amount of the metallic foreign substance as removed from the water-absorbent resin powder is increased, the more effectively the above deterioration can be prevented.

The present inventors have found out that: in a step of transferring a dried product powder of a crosslinked hydrogel polymer that will be a water-absorbent rein powder, the removal of the metallic foreign substance from the above water-absorbent rein powder can be easily and certainly carried out by passing a specific magnetic field through this dried product powder, with the result that the properties of the water-absorbent rein powder can be improved greatly.

In addition, the present inventors have found out that the cause of generating the metallic foreign substance is the following.

When a water-absorbent resin powder having a narrow particle diameter distribution and a low fine-powder content is industrially mass-produced, a dried product of a crosslinked hydrogel polymer is usually continuously pulverized, and then continuously transferred to a classification step and continuously classified. The metallic foreign substance is generated as a result that the dried product powder hurts metallic faces when contacting them on such a production line.

The metallic foreign substance is easily generated when not less than 50% of faces, contacting the water-absorbent resin powder, of apparatuses as used for the above steps or other steps on the production line are stainless steel faces.

The water-absorbent resin powder is favorably produced by a process including the steps of: drying a hydrogel polymer as obtained by polymerizing a hydrophilic monomer; thereafter pulverizing the resultant dry polymer with a pulverizer, such as a roll mill, a high-speed-rotary pulverizer, or a jet pulverizer; and further, classifying and transferring the resultant pulverized product. In these steps, the dried product of the crosslinked hydrogel polymer hurts metallic faces to generate the metallic foreign substance.

When the water-absorbent resin powder is used for sanitary materials, the water-absorbent resin powder having a particularly narrow particle diameter distribution and a low fine-powder content is favorable because it has excellent properties. Accordingly, the dried product of the crosslinked hydrogel polymer is pulverized, and thereafter its particle diameter distribution is arranged to the above favorable one in a sieving classification step. At this stage, if an attempt is made to decrease the fine-powder content by raising classification accuracy in the sieving classification step in order to enhance an SFC (a saline flow conductivity) of the water-absorbent resin, then the sieve is easily hurt. Such a tendency is more remarkable in the case where at least two sieves are used, particularly, in at least two places.

The above deterioration is particularly easily caused when the load to the production line of the water-absorbent resin powder is so large as to continuously produce the water-absorbent resin powder at a productivity of not less than 500 kg/hr per line.

As to the above deterioration, the metallic foreign substance is particularly easily generated when an attempt is made to obtain powder particles of the irregular shape having a specific narrow particle diameter distribution. The crosslinked hydrogel polymer is preliminarily divided into small pieces before pulverization. However, if the crosslinked hydrogel polymer obtained by carrying out shearing polymerization and/or static polymerization is divided into small pieces, the resultant dry product is of the irregular shape or agglomerated, and is therefore so angular as to easily hurt particularly the metallic faces of the apparatus.

The water-absorbent resin is generally surface-crosslinked to thereby improve its water absorption performance. However, in this surface-crosslinking step, particularly, if this surface-crosslinking is carried out at 150 to 250° C., the hardness of the water-absorbent resin powder is increased because the solid content of the water-absorbent resin is raised. Therefore, particularly, the contamination with the metallic foreign substance is easily caused because the resultant water-absorbent resin powder still more easily hurts the metallic faces of the apparatus.

The contamination with the metallic foreign substance may be caused also when the crosslinked hydrogel polymer powder is transferred or stored during or after the production of this powder.

The present inventors proposed the use of a sieving device in a heated and/or heat-retained state in order to classify a dried product of a crosslinked hydrogel polymer as to particle size with high accuracy and good productivity (JP-A-202187/1998 and EP 855232). When the sieving classification treatment of the dried product of the crosslinked hydrogel polymer is carried out at a high temperature, the resultant dried product comes to have such a low water content as to be hard. Therefore, the contamination with the metallic foreign substance is easily caused in a large amount.

A production process for a water-absorbent resin powder according to the present invention, which has been completed after having come through such as the above consideration and experimental confirmation, comprises the steps of: polymerizing an unsaturated monomer; and drying the resultant crosslinked hydrogel polymer, wherein the water-absorbent resin powder has a crosslinked structure and a mass-average particle diameter of 300 to 600 μm wherein the ratio of fine particles having particle diameters of not larger than 150 μm is less than 10 mass % of the water-absorbent resin powder, with the production process being characterized by further comprising a magnetic-flux irradiation step of passing a magnetic field having a magnetic flux density of not less than 0.05 $Wb/m^2$ through the water-absorbent resin powder after the drying step in the production process.

The present invention production process enables easy production of the above present invention water-absorbent resin powder. Particularly, if the water-absorbent resin powder is exposed to the magnetic flux in the present invention production process, then there can be removed the metallic foreign substance, especially, fine particles of the metallic foreign substance having particle diameters of not larger than 1 mm, and further especially, even a fine iron powder and a stainless metallic foreign substance that cannot be seen with the eye.

As to the present invention production process for a water-absorbent resin powder, it is favorable that this process, after the drying step, further comprises a pulverization step, a classification step, and continuous transferring steps of connecting the steps of the production process to each other, wherein the magnetic-flux irradiation step is included after the classification step.

As to the present invention production process for a water-absorbent resin powder, it is favorable that the irradiation of the magnetic flux is carried out in at least two places on the continuous transferring steps, and that one of the at least two places is located just upstream of a hopper for storing an end product of the water-absorbent resin powder.

Furthermore, as to the present invention production process for a water-absorbent resin powder, it is favorable that the magnetic flux is a magnetic flux having a magnetic flux density of not less than 1.0 $Wb/m^2$, and it is favorable that the irradiation of the magnetic flux is carried out with a permanent magnet and/or an electromagnet.

The present invention production process for a water-absorbent resin powder displays remarkable effects when the load to the production line is so large as to continuously produce the water-absorbent resin powder at a productivity of not less than 500 kg/hr per line.

A water-absorbent resin powder, according to the present invention, is a water-absorbent resin powder of which the major proportion is comprised of a polymer that is obtained by a process including the step of polymerizing a monomer including acrylic acid and/or its salt in a major proportion, and which has a mass-average particle diameter of 300 to 600 μm wherein the ratio of fine particles having particle diameters of not larger than 150 μm is less than 10 mass % of the water-absorbent resin powder, and which has a crosslinked structure and is irradiated with a magnetic flux.

A sanitary material, according to the present invention, comprises a water-absorbent resin powder of which the major proportion is comprised of a polymer that is obtained by a process including the step of polymerizing a monomer including acrylic acid and/or its salt in a major proportion, and which has a mass-average particle diameter of 300 to 600 μm wherein the ratio of fine particles having particle diameters of not larger than 150 μm is less than 10 mass % of the water-absorbent resin powder, and which has a crosslinked structure and is irradiated with a magnetic flux.

Explanation of the Symbols is as follows:

| | |
|---|---|
| 1 | Metallic-foreign-substance separator |
| 2 | Separating chamber |
| 2a | Slope portion |
| 3 | Substance inlet |
| 4 | Substance outlet |
| 5 | Perforated plate |
| 5a | Opening |
| 6 | Air-current generator |
| 7 | Air-introducing inlet |
| 7a | Air-aspirating inlet |
| 7b | Air-blowing outlet |
| 8 | Metallic-foreign-substance recovering receptacle |
| 9 | Opening portion |
| 10 | Handle |
| 11 | Magnet |
| 12 | Dispersing plate |
| 13 | Distance |
| 14 | Pitch |
| 21 | Water-absorbent resin powder |
| 22 | Classifying machine |
| 23a | Metallic-foreign-substance separator (iron-removing apparatus 1) |
| 23b | Metallic-foreign-substance separator (iron-removing apparatus 2) |
| 23c | Metallic-foreign-substance separator (iron-removing apparatus 3) |
| 23d | Metallic-foreign-substance separator (iron-removing apparatus 4) |

-continued

| | |
|---|---|
| 24a | Hopper 1 |
| 24b | Hopper 2 |
| 25 | Heat treatment process |
| 26 | Water-absorbent resin product |
| 31 | Tank |
| 32 | Glass tube |
| 33 | 0.69 mass % aqueous sodium chloride solution |
| 34 | L-tube having cock |
| 35 | Cock |
| 40 | Receptacle |
| 41 | Cell |
| 42 | Stainless wire mesh |
| 43 | Stainless wire mesh |
| 44 | Swollen gel |
| 45 | Glass filter |
| 46 | Piston |
| 47 | Holes in piston |
| 48 | Collecting receptacle |
| 49 | Balance |

DETAILED DESCRIPTION OF THE INVENTION (Water-Absorbent Resin Powder):

The water-absorbent resin powder as obtained by the present invention production process is a water-absorbent resin powder of which the major proportion is comprised of a polymer that is obtained by a process including the step of polymerizing a monomer including acrylic acid and/or its salt in a major proportion, and which has a mass-average particle diameter of 300 to 600 μm wherein the ratio of fine particles having particle diameters of not larger than 150 μm is less than 10 mass % of the water-absorbent resin powder, and which has a crosslinked structure and is irradiated with a magnetic flux.

The water-absorbent resin powder as obtained by the present invention production process is a fine particle having an even particle diameter distribution, which has a mass-average particle diameter of 300 to 600 μm wherein the ratio of fine particles having particle diameters of not larger than 150 μm is less than 10 mass % of the water-absorbent resin powder, and which has a crosslinked structure. Although the water-absorbent resin powder has high water absorption performance, it has little metallic-foreign-substance content, and it is difficult to deteriorate the water absorption performance.

Incidentally, in the present specification, the terms "mass" and "mass %" are treated as the synonyms "weight" and "weight %" respectively.

The water-absorbent resin powder essentially has a particle diameter of 300 to 600 μm from the viewpoint of its properties, but it is favorably 350 to 550 μm, more favorably 400 to 500 μm. The ratio of fine particles having particle diameters of not larger than 150 μm is essentially less than 10 mass %, but it is favorably less than 5 mass %, more favorably less than 3 mass %. The reason is because the high water absorption performance can be displayed by adjusting these particle diameter and fine-powder content.

The shape of the water-absorbent resin powder may be spherical, cubic, columnar, plate, scale, bar, needle, or fibrous. Particularly, an unshaped pulverized particle as obtained in the pulverization step after the drying is favorable.

If there is a water-absorbent resin powder according to the present invention, it can achieve high water absorption performance such as: a water absorption capacity of favorably not less than 25 g/g without load (CRC), more favorably not less than 28 g/g, particularly favorably not less than 31 g/g; and a water absorption capacity of favorably not less than 20 g/g under a load (AAP) (4.9 kPa), more favorably not less than 23 g/g, particularly favorably not less than 25 g/g, and it can maintain the high water absorption performance for a long time. In addition, the below-mentioned gel stability (as defined in examples) is adjusted to favorably not more than 5 mass %, more not more than 3 mass %, particularly favorably not more than 1 mass %, and therefore the gel deterioration can be greatly decreased.

The water-absorbent resin powder as obtained by the present invention production process has excellent water absorption performance, and the deterioration of this high water absorption performance is suppressed, and the water absorption performance is maintained for a long time. Therefore, although it is not limited, it can favorably be used as a sanitary material.

According to the present invention, the water-absorbent resin powder, which is excellent in balance of an absorption capacity without load (CRC), an absorption capacity under a load (AAP), and a saline flow conductivity (SFC), and which has good absorption properties, can easily be produced, and it is widely used for such as water-holding agents for agricultural and horticultural fields, industrial water-holding agents, moisture-absorbing agents, moisture-removing agents, and building materials. However, the water-absorbent resin powder can particularly favorably be used for sanitary materials for absorbing feces, urine, or blood, such as disposable diapers and sanitary napkins.

The present invention water-absorbent resin powder is excellent in the balance of the above various properties, and therefore the sanitary material can generally be used in a high concentration as a concentration of the water-absorbing agent (mass ratio of water-absorbent resin powder to the total of water-absorbing agent and fibrous base material), for example, in the range of 30 to 100 mass %, favorably 40 to 100 mass %, more favorably 50 to 95 mass %.

That is to say, the present invention sanitary material comprises a water-absorbent resin powder of which the major proportion is comprised of a polymer that is obtained by a process including the step of polymerizing a monomer including acrylic acid and/or its salt in a major proportion, and which has a mass-average particle diameter of 300 to 600 μm wherein the ratio of fine particles having particle diameters of not larger than 150 μm is less than 10 mass % of the water-absorbent resin powder, and which has a crosslinked structure and is irradiated with a magnetic flux.

(Production Process for Water-Absorbent Resin Powder):

The present invention production process for a water-absorbent resin powder comprises the steps of: polymerizing an unsaturated monomer; and drying the resultant crosslinked hydrogel polymer, and the production process further comprises a magnetic-flux irradiation step of passing a magnetic field having a magnetic flux density of not less than 0.05 Wb/m$^2$ through the water-absorbent resin powder in at least a place after the drying step in the production process.

The more favorable mode of the present invention production process for a water-absorbent resin powder is that the production process comprises a pulverization step, a classification step, and continuous transferring steps of connecting the steps of the production process to each other, and that the magnetic-flux irradiation step is included after the classification step. Incidentally, there may be a case where there is no continuous transferring step and each production process is directly connected, and the production process means a process in relation to the entire production also including the transferring and storage. It is favorable when any of the polymerization step, drying step, pulverization step, and classification step is connected, and more favorable when all of them are connected. Furthermore, the following mode is more favorable: the irradiation of the magnetic flux is carried out in at least two places on the continuous transferring steps, and one of the at least two places is located just upstream of a hopper for storing an end product of the water-absorbent resin powder. Furthermore, the magnetic-flux irradiation step may be included for the water-absorbent resin powder that is delivered as a product before using (before swelling liquids).

In the present invention, the effect of the present invention is particularly sufficiently displayed when a portion of faces (favorably not less than 50% thereof, more favorably not less than 70% thereof, particularly favorably not less than 90% thereof), contacting the water-absorbent resin or its powder, of apparatuses as used for the production line of the water-absorbent resin powder may be stainless steel (iron) faces.

Hereinafter, the fundamental steps in the present invention production process for a water-absorbent resin powder are explained in detail, and then the magnetic-flux irradiation step is explained in detail subsequent to these explanations.

[Production Step of Crosslinked Hydrogel Polymer]:

The present invention water-absorbent resin is a conventionally known water-absorbent resin, and a water-absorbent resin having a small amount of the below-mentioned additive is also generally referred to as the water-absorbent resin. It is, for example, a crosslinked polymer that absorbs favorably not less than 5 times, more favorably 50 to 1,000 times as large a quantity of water as the original weight in deionized water, and thereby forms an anionic, nonionic, or cationic water-insoluble hydrogel. Incidentally, the term "water-insoluble" means such a state that the uncrosslinked water-extractable content (water-soluble polymer) in the water-absorbent resin is not more than 50 mass %, more favorably not more than 20 mass %, still more favorably not more than 15 mass %, most favorably not more than 10 mass %.

The water-absorbent resins can be used either alone respectively or in combinations with each other. Among them, water-absorbent resins containing an acid group, and further one or mixtures of those which have a carboxyl group and are carboxylic acids or their salts are favorable. It is typical that the water-absorbent resin comprises a polymer of which the major proportion is obtained by a process including the steps of polymerizing and crosslinking monomers including acrylic acid and/or its salt (neutralized product) in a major proportion, and the polymer is namely a crosslinked poly(acrylic acid salts), if necessary, further including a graft component.

Examples of the above acrylic acid salts include: acrylic acid salts of alkaline metals, such as sodium, potassium, and lithium; and ammonium salts and amine salts of acrylic acid. The constituent units of the above water-absorbent resin comprise: acrylic acid of favorably 0 to 50 mol %, more favorably 10 to 40 mol %; and an acrylic acid salt of favorably 100 to 50 mol %, more favorably 90 to 60 mol % (wherein the total of both is not more than 100 mol %). Incidentally, the molar ratio between this acid and its salt is referred to as a neutralization ratio. The neutralization of the water-absorbent resin so as to form the above salt may be carried out in a state of a monomer before the polymerization, or in a state of a polymer during or after the polymerization, or in combinations with each other.

The aforementioned water-absorbent resin may be a self-crosslinking-type water-absorbent resin obtained by using no crosslinking agent, but it is favorably obtained by copolymerizing or reacting with a crosslinking agent (internal-crosslinking agent for water-absorbent resins) having at least two polymerizable unsaturated groups or at least two reactive groups per molecule. The content of these internal-crosslinking agents is specifically in the range of favorably 0.001 to 2 mol %, more favorably 0.005 to 0.5 mol %, still more favorably 0.01 to 0.2 mol %, particularly favorably 0.03 to 0.15 mol %, of the monomers (excluding the crosslinking agent) such as N,N'-methylenebis(meth)acrylamide, and (poly)ethylene glycol di(meth)acrylate.

The crosslinked hydrogel polymer as used in the present invention production process is obtained by a process including the steps of: carrying out polymerization of a water-soluble (particularly, soluble in water in an amount of not smaller than 10 mass % at 25° C.) polymerizable-unsaturated-group-containing monomer and a crosslinking agent so as to form a crosslinked structure when the polymerization is carried out; and then drying the resultant polymer. Examples of the water-soluble polymerizable-unsaturated-group-containing monomer include: anionic monomers, such as (meth)acrylic acid, maleic acid, maleic anhydride, fumaric acid, crotonic acid, itaconic acid, 2-(meth)acryloylethanesulfonic acid, 2-(meth)acryloylpropanesulfonic acid, 2-(meth)acrylamido-2-methylpropanesulfonic acid, vinylsulfonic acid, styrenesulfonic acid, and salts thereof; nonionic hydrophilic-group-containing monomers, such as (meth)acrylamide, N-substituted (meth)acrylamide, 2-hydroxyethyl (meth)acrylate, 2-hydroxypropyl (meth)acrylate, methoxypolyethylene glycol (meth)acrylate, and polyethylene glycol mono (meth)acrylate; and amino-group-containing unsaturated monomers such as N,N-dimethylaminoethyl (meth)acrylate, N,N-dimethylaminopropyl (meth)acrylate, N,N-dimethylaminopropyl(meth)acrylamide, and quaternary salts thereof. Examples of the crosslinking agent include: compounds having at least two polymerizable unsaturated double bonds in their molecules; compounds having at least two groups reactable with a functional group (e.g. an acid group, a hydroxyl group, or an amino group) in the water-soluble polymerizable-unsaturated-group-containing monomer; compounds having at least one unsaturated double bond and at least one group reactable with a functional group in the monomer each; compounds having at least two points in their molecules wherein the points are reactable with a functional group in the monomer; or hydrophilic polymers which can form a crosslinked structure by such as graft bonds when the monomer component is polymerized.

From the reason of such as availability of raw materials, crosslinked products of partially neutralized polyacrylic acids are favorably used as the crosslinked hydrogel polymer.

Incidentally, as to monomers other than the acrylic acid, crosslinking agents as used, and further additives when the polymerization is carried out, publicly known methods are widely used for a production process for a high-water-absorbent resin, and the below-mentioned patents can also be applied to the present invention. Incidentally, the reversed-phase suspension polymerization is a method in which a monomer solution is suspended in a hydrophobic organic solvent, and its examples are disclosed in such as U.S. Pat. Nos. 4,093,776, 4,367,323, 4,446,261, 4,683,274, and 5,244,735. The aqueous solution polymerization is a method in which a monomer solution is polymerized by using no dispersive solvent, and its examples are disclosed in such as U.S. Pat. Nos. 4,625,001, 4,873,299, 4,286,082, 4,973,632, 4,985,518, 5,124,416, 5,124,416, 5,264,495, 5,145,906, 5,380,808, EP 0811636, EP 0955086, EP 0922717, and WO 2001/38402.

In the present invention, in order to display the present invention effect such as the inhibition of gel deterioration and the removal of the metallic foreign substance to the maximum, the crosslinked hydrogel polymer is favorably a product obtained by a process including the steps of: carrying out shearing polymerization (particularly, kneader-polymerization) and/or static polymerization (particularly, belt polymerization) to obtain a crosslinked hydrogel polymer; and then dividing the resultant crosslinked hydrogel polymer into small pieces.

[Drying Step of Crosslinked Hydrogel Polymer]:

Although the dried product of the crosslinked hydrogel polymer is not limited, it is favorably obtained by drying the crosslinked hydrogel polymer favorably at 150 to 230° C., more favorably at 160 to 180° C., in order to display the present invention effect such as the inhibition of gel deterioration and the removal of the metallic foreign substance to the maximum.

From the viewpoint of properties, and in order to display the present invention effect to the maximum, the water content of the end product after drying (as defined by an amount as decreased at 180° C. after 3 hr) is favorably not less than 90 mass %, more favorably in the range of 93 to 99.9 mass %, particularly favorably 95 to 99.8 mass %.

The above drying can be carried out by various methods, but it is favorably carried out on a mesh or punched metal in consideration of the influence upon the properties of the water-absorbent resin. This is because it is difficult to cause the metallic foreign substance if the static drying is carried out on the mesh or punched metal. In the drying on the punched metal, the effect of suppressing the contamination with the metallic foreign substance is higher.

In addition, as is mentioned below, the drying step may also include a step of surface-crosslinking the crosslinked hydrogel polymer or its dried product at 150 to 250° C.

[Pulverization Step of Dried Product of Crosslinked Hydrogel Polymer]:

The present invention production process for a water-absorbent resin powder favorably includes a step of pulverizing the above dried product of the crosslinked hydrogel polymer with a pulverizer to produce a particulate product.

Examples of the pulverizer usable in this pulverization step include roller mills, knife mills, hammer mills, pin mills, and jet mills, and the pulverizer is favorably provided with a means of heating its inner faces.

In the pulverization step, it is favorable that the inner faces of the pulverizer are put in a heated state from the outside, or that the temperature of the inner faces of the pulverizer is kept at above a temperature that is lower than a temperature of the particulate water-absorbent resin by 20° C. This is because the dried product powder as obtained by the pulverization adheres to the inner sidewall of the pulverizer, and further large cohered matters are formed, and then they fall off due to the vibration of the pulverizer, and the resultant product tends to be contaminated with them.

The dried product powder of the crosslinked hydrogel polymer is a powder having fluidity, and favorably displays an SFC (a saline flow conductivity) of not less than 20 (unit: $10^{-7} \times cm^3 \times s \times g^{-1}$), more favorably not less than 30 (unit: $10^{-7} \times cm^3 \times s \times g^{-1}$). This is because a dried product powder displaying a low SFC tends to be easily contaminated with a metallic foreign substance (e.g. a powder). The reason is not apparent, but it is presumed that: the particle diameter distribution of the water-absorbent resin should be coarsely and narrowly controlled so as to raise the SFC, and as a result, the inner faces of the apparatus are greatly damaged wherein the inner faces contact the crosslinked hydrogel polymer or its dried product (water-absorbent resin powder), and therefore the contamination with the metal powder is easily caused.

[Transferring Steps of Dried Product Powder of Crosslinked Hydrogel Polymer]:

The present invention production process for a water-absorbent resin powder favorably comprises the step of: after the dried product of the crosslinked hydrogel polymer is pulverized, continuously transferring the above dried product powder with such as a transferring machine.

Examples of the transferring machine usable in the above continuous transferring steps include: belt conveyers, screw conveyers, chain conveyers, vibrating conveyers, and pneumatic conveyers, or machines having a means of heating and/or thermally insulating their inner faces from the outside. Among these transferring machines, the chain conveyers or pneumatic conveyers are favorable.

In the above continuous transferring steps, at least a portion of the continuous transferring steps is carried out by pneumatic transferring. In order to decrease the damage of the dried product powder, namely, the water-absorbent resin powder having high properties, due to the transferring, or in order to suppress the contamination with the metallic foreign substance, at least a portion of the continuous transferring step is favorably carried out by pneumatic transferring.

In these continuous transferring steps, it is favorable that: the inner faces of the transferring machine are put in a heated state and/or a heat-retained state from the outside. This is because there is a tendency such that the clogging in the transferring machine can effectively be suppressed.

[Classification Step of Dried Product Powder of Crosslinked Hydrogel Polymer]:

The present invention production process for a water-absorbent resin powder favorably comprises a step of continuously classifying a dried product powder resultant from the above pulverization.

Although there is no especial limitation on this continuous classification step, it is favorably carried out by sieve (metal sieve comprised of stainless steel) classification.

For the aimed properties and particle diameter distribution, at least two sieves are favorably used in the classification step at the same time. In addition, the classification step is favorably used before surface-crosslinking, and further in at least two places before and after the surface-crosslinking.

In the continuous sieving classification step, the sieve is favorably heated or heat-retained. However, if the sieve classification is carried out at a high temperature, the water content of the dried product powder is lowered and the dried product powder becomes hard. As a result, it is presumed that: the damage as caused to the sieve is increased, and the dried product powder tends to be easily contaminated with a fine metallic foreign substance. Therefore, the temperature is favorably arranged not to raise so high (favorably in the range of 40 to 100° C., more favorably 50 to 80° C.).

[Surface Treatment Step of Crosslinked Hydrogel Polymer]:

The crosslinked hydrogel polymer is favorably surface-crosslinked in a suitable stage in order to improve the absorption performance. This surface-crosslinking step is carried out by heating favorably at not lower than 100° C., more favorably 150 to 250° C., still more favorably 170 to 230° C., particularly favorably 180 to 220° C. The heating time is favorably for 1 minute to 3 hours, more favorably 5 minutes to 2 hours, still more favorably 10 minutes to 1 hour.

It was understood that a surface-crosslinked water-absorbent resin, particularly a water-absorbent resin as surface-crosslinked at 150 to 250° C. tends to be easily contaminated with a trace amount of metallic foreign substance, and that a water-absorbent resin powder as surface-crosslinked by a dehydratable crosslinking agent tends to be easily contaminated with a metallic foreign substance in particular. In these surface-crosslinking at a high temperature and dehydratable crosslinking, the water content of the water-absorbent resin powder as derived from esterification reaction is low, and therefore the water-absorbent resin powder is hard. As a result, it is presumed that the inner faces of the plant are greatly damaged, and that the contamination with a metal powder is easily caused.

The surface-crosslinking techniques are, for example, disclosed in such as JP-A-044627/1982, JP-A-042602/1983, JP-B-018690/1985, JP-A-180233/1983, JP-A-062665/1984, JP-A-016903/1986, JP-A-246403/1992, U.S. Pat. Nos. 5,422,405, 5,597,873, EP 450923, EP 450924, WO 99/42494, WO 99/42496, and WO 99/43720. Among these, it is favorably applied to a surface-crosslinked product as obtained by using at least a polyhydric alcohol as a surface-crosslinking component. The polyhydric alcohol has high properties, and besides, it favorably can give plasticity to the water-absorbent resin surface, and decrease the cause and contamination of the metallic foreign substance.

By using a water-insoluble fine particle as an additive in the present invention, the liquid permeability of the water-absorbent resin powder and the blocking resistance when absorbing moisture can be improved. As to the fine particle, an inorganic or organic water-insoluble fine particle having a size of favorably not larger than 10 $\mu$m, more favorably not larger than 1 $\mu$m, particularly favorably not larger than 0.1 $\mu$m, is used. Specific examples thereof include silicon oxide (trade name: Aerosil produced by Nippon Aerosil Co., Ltd.), titanium oxide, and aluminum oxide. The blending is carried out by powder-blending (dry-blending) or slurry-blending, and the amount as used is favorably in the range of not larger than 10 parts by mass, more favorably 0.001 to 5 parts by mass, still more favorably 0.01 to 2 parts by mass, per 100 parts by mass of the water-absorbent resin powder.

In addition to the surface-crosslinking in the present invention, the production process may further comprise a step of giving various functions to the water-absorbent resin, if necessary, such as a step of adding materials such deodorants, antimicrobial agents, perfumes, foaming agents, pigments, dyes, hydrophilic short fibers, plasticizers, pressure-sensitive adhesives, surfactants, manure, oxidants, reductants, water, salts, chelating agents, disinfectants, hydrophilic polymers such as polyethylene glycols and polyethylenimine, hydrophobic polymers such as paraffin, thermoplastic resins such as polyethylene and polypropylene, and thermosetting resins such as polyester resins and urea resins. The amount of these additives as used is in the range of 0 to 10 parts by mass, favorably 0 to 1 part by mass, per 100 parts by mass of the water-absorbent resin.

Incidentally, these products after the surface-crosslinking or the addition of the additive may also be generally referred to as water-absorbent resins in the present invention.

(Magnetic-Flux Irradiation Step: Removal of Metallic Foreign Substance from Crosslinked Hydrogel Polymer):

The present invention production process for a water-absorbent rein powder comprises the magnetic-flux irradiation step of passing a magnetic field having a magnetic flux density of not less than 0.05 Wb/m$^2$ through the water-absorbent resin powder after the aforementioned drying step in the production process.

Incidentally, the step of passing the magnetic field having a magnetic flux density of not less than 0.05 Wb/m$^2$ through the water-absorbent resin powder, as mentioned in the present invention, means a step of passing a magnetic field through a fixed or moving water-absorbent rein powder, favorably a continuous flowing water-absorbent rein powder, more favorably a continuous transferring water-absorbent rein powder.

The present invention is favorably applied to the continuous production of the water-absorbent rein (wherein the continuous production means production steps after the drying step, and even if the production steps may partially include a batch step, they are regarded as a continuous step if they are connected or continuous), and the magnetic-flux irradiation step is favorably a step of contacting or neighboring the continuous flowing water-absorbent rein powder with a fixed-type permanent magnet and/or electromagnet (favorably within 10 cm, more favorably within 5 cm, particularly favorably within 1 cm), particularly contacting at least one portion of the water-absorbent rein powder with the aforementioned magnet. When these passings or contactings are carried out in the transferring steps, the water-absorbent rein powder is transferred with a transferring apparatus having a cross section of not larger than 1,000 cm$^2$, more favorably not larger than 500 cm$^2$, and the below-mentioned magnets may be arranged at any of the inlet, middle portion, and outlet.

In the above step, at least a portion of the metallic foreign substances is removed from the water-absorbent rein powder through which the magnetic field is passed, and the amount as removed is favorably not smaller than 0.01 g, more favorably not smaller than 0.05 g, particularly favorably not smaller than 0.10 g, per 1 ton of the water-absorbent rein powder. The metallic foreign substance as removed is usually fixed by magnetic force of the permanent magnet and/or electromagnet with which the water-absorbent resin powder contacts or neighbors, and these metallic foreign substances may be periodically removed.

The more favorable mode of the present invention production process for a water-absorbent resin powder is that: after the drying step, the production process further comprises a pulverization step, a classification step, and continuous transferring steps of connecting the steps of the production process to each other; and the magnetic-flux irradiation step is included after the classification step. Furthermore, the more favorable mode is that the irradiation of the magnetic flux is carried out in at least two places on the continuous transferring steps, and that one of the at least two places is located just upstream of a hopper for storing an end product of the water-absorbent resin powder.

Because the magnetic field is irradiated just upstream of the hopper, it is effectively suppressible that the water-absorbent resin powder is contaminated with a trace of fine metallic foreign substance as formed by: contacting the inner faces of the apparatus (plant) such as a transferring apparatus with the water-absorbent resin powder; and then destroying the inner faces. The content of the metallic foreign substance can be suppressed more effectively because the treatment of removing the metallic foreign substance by the magnetic flux is carried out in at least two places.

Although there is no especial limitation on a place where the treatment of removing the metallic foreign substance is carried out except for just upstream of the hopper, the place is favorably located after the classification step. The treatment is more favorably carried out in at least two places after the classification step, still more favorably before and after the surface-crosslinking in particular.

[Metallic Foreign Substance]:

The metallic foreign substance as mentioned in the present invention means a metal separately existing separately from the water-absorbent resin, particularly a heavy metal (inorganic metal/usually, its oxide or complex), and its generating source is from such as a metal powder and metal piece derived from the plant (production equipment). The metallic foreign substance has a material quality of which the major proportion is usually comprised of iron, nickel, manganese, or chromium, especially iron, and has a shape of plate, needle, powder, or scale, and is a metal having a size of not larger than 10 mm, favorably not larger than 1 mm, particularly favorably 0.1 mm. Specific examples of the major proportion include stainless steels such as SUS (e.g. SUS304 and SUS316). Incidentally, metallic impurities (e.g. transition metal ions, such as $Fe^{2+}$ and $Fe^{3+}$; alkaline metal ions, such as $Li^+$, $Na^+$, and $K^+$; alkaline earth metal ions, such as $Mg^{2+}$ and $Ca^{2+}$; other metal ions; remaining initiators (e.g. sodium persulfate); and sodium acrylate as a remaining monomer, which are derived from a raw material and monomer as included in the water-absorbent resin, are not referred to as a metallic foreign substance in the present invention.

[Magnetic Flux]:

As to the method for separating the metallic foreign substance in the present invention, there is a method by using a magnetic flux in addition to the method by using an air current.

[Magnetic Flux Density]:

When the continuous production is carried out particularly at a productivity of not less than 500 kg/hr per line in the present invention, the metallic foreign substance can be separated by irradiating the water-absorbent resin powder with a magnetic flux of which the magnetic flux density of the metallic-foreign-substance separator (iron-removing apparatus) is not less than 0.05 $Wb/m^2$ (0.05 tesla equivalent to 500 gauss), favorably not less than 0.5 $Wb/m^2$, more favorably not less than 0.8 $Wb/m^2$, still more favorably not less than 1.0 $Wb/m^2$, most favorably not less than 1.2 $Wb/m^2$ (12,000 gauss).

Incidentally, the above magnetic flux density is measured with a search coil and a magnetic-flux-meter, and the magnetic field is simply measured with a gauss meter. Then, they may be measured by fitly correcting the search coil and a semiconductor probe (a semiconductor probe including a hall element as a censor) on the basis of a standard magnet. In addition, other else, the absolute magnetic field strength can be measured even by a nucleic magnetic resonance method. Furthermore, the test method for fundamental properties of the magnet is also disclosed in JIS C2501.

In general, it is said that a stainless steel is not attracted to a magnet. However, surprisingly, the metallic foreign substance after the production process in the water-absorbent resin powder can be attracted to the magnet and then removed.

[Magnet]:

When a magnet is used as a means of irradiating with a magnetic flux in the present invention, either a permanent magnet or an electromagnet may be used. In addition, these may be used together. Furthermore, a bar magnet is favorably used in order to display the present invention effect sufficiently.

Figure 3:
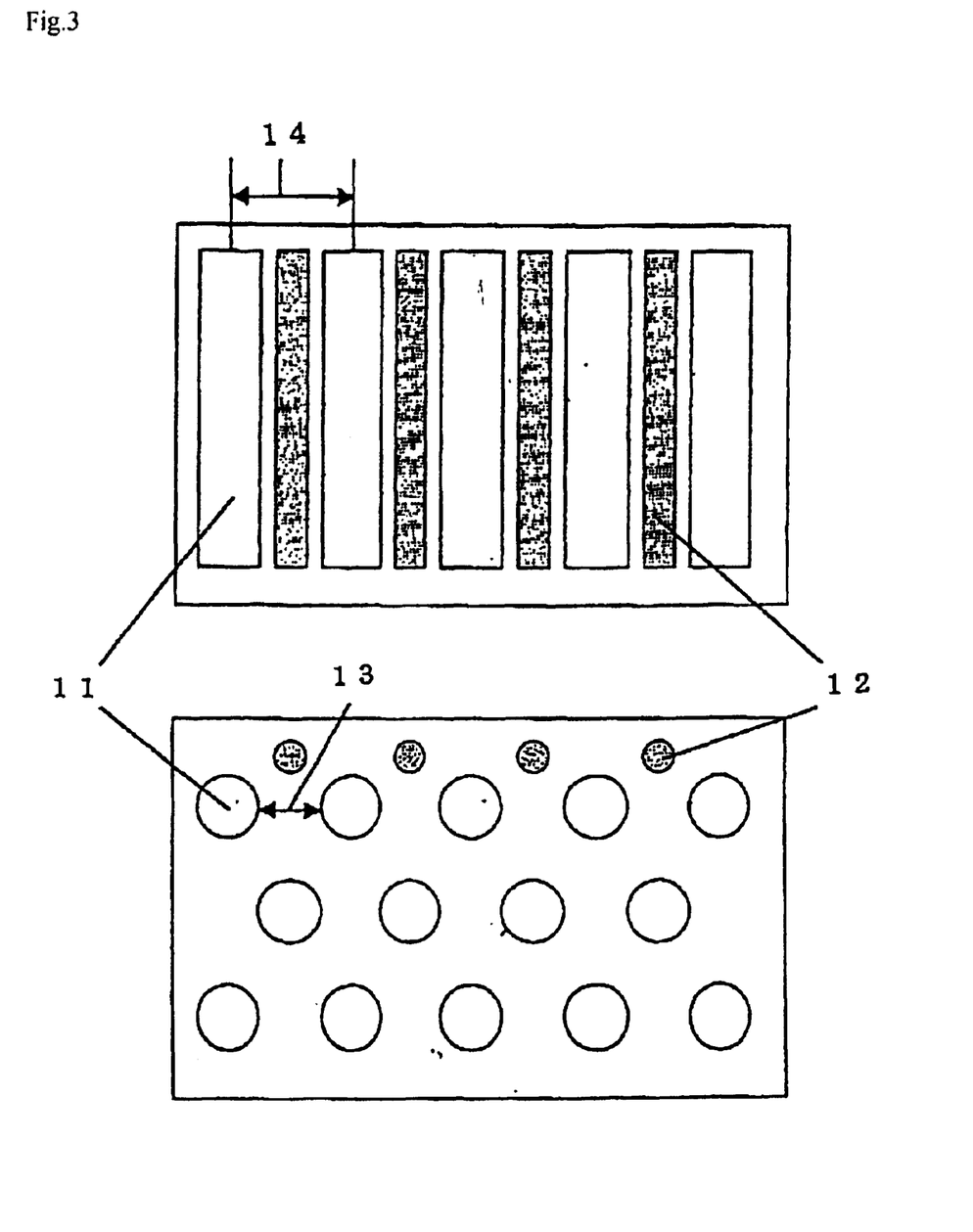
FIG. 3 is a schematic view of the metallic-foreign-substance separator (iron-removing apparatus) in the present invention.

[Interval (Space)]:

In the present invention, the magnets of the metallic-foreign-substance separator (iron-removing apparatus) are favorably arranged in the shape of a lattice. The present invention effect can be displayed sufficiently because the magnets are arranged in the shape of a lattice. The lattice space is favorably in the range of 5 to 30 mm, more favorably 5 to 25 mm, still more favorably 5 to 20 mm, yet still more favorably 5 to 15 mm, particularly favorably 5 to 10 mm. Herein, the lattice space of the magnet means an interval between the individual magnets as shown in FIG. 3. In case where this space is too wide, it is difficult to remove the metal effectively. In addition, in case where this space is too narrow, the water-absorbent resin powder cannot pass and therefore the productivity is lowered.

[Pitch]:

In the present invention, the pitch between the magnets of the metallic-foreign-substance separator (iron-removing apparatus) is favorably in the range of 10 to 60 mm, more favorably 10 to 40 mm, still more favorably 10 to 35 mm, yet still more favorably 15 to 35 mm, particularly favorably 15 to 32 mm. Herein, the pitch between the magnets means an interval between the centers of the individual magnets as shown in FIG. 3, and is determined by a thickness of the magnet and a distance between the individual magnets. As to this pitch, in case where this pitch is too wide, it is difficult to remove the metal effectively. In addition, in case where this pitch is too narrow, the water-absorbent resin powder cannot pass and therefore the productivity is lowered.

[Lattice Number]:

In the present invention, there is no especial limitation on the lattice number of the magnets in the metallic-foreign-substance separator (iron-removing apparatus), but the lattice including the magnets is arranged favorably at least double, more favorably at least triple in a direction of transferring the water-absorbent resin powder, favorably in a direction of falling.

[Dispersing Plate]:

In the present invention, a dispersing plate is favorably arranged in front of the magnets of the metallic-foreign-substance separator (iron-removing apparatus). In order to efficiently remove the metal, this dispersing plate is a plate for not one-sidedly arranging the water-absorbent resin powder, and it is favorably arranged at an opening between the top magnets.

[Place As Arranged]:

There is no limitation on the place where the magnet is arranged. For example, the magnets are favorably arranged in at least two places in the production line, and one of the at least two places is located just upstream of a hopper for storing an end product of the water-absorbent resin powder. Because the magnetic is arranged just upstream of the hopper, it is effectively suppressible that the water-absorbent resin powder is contaminated with the metallic foreign substance due to vibration wherein the metallic foreign substance adheres to the inner faces of such as a transferring apparatus after the sieve classification. In addition, other else, the magnet may be arranged at a hopper outlet. The content of the metallic foreign substance can be suppressed more effectively because the treatment of removing the metallic foreign substance by the magnetic flux is carried out in at least two places. Although there is no especial limitation on a place where the treatment of removing the metallic foreign substance is carried out except for just upstream of the hopper, the place is favorably located after the classification step. The treatment is favorably carried out in at least two places after the classification step, more favorably before and after the surface-crosslinking in particular.

[Productivity]:

Although not especially limited in the water-absorbent resin powder, the load to the production line is so large as to continuously produce the water-absorbent resin powder at a productivity of not less than 500 kg/hr per line. Even in the production line including the steps of: continuously pulverizing a dried product of a crosslinked hydrogel polymer; continuously transferring the pulverized product; and continuously classifying the transferred pulverized product, the water-absorbent resin powder can easily be produced by carrying out a step of separating a metallic foreign substance from the dried product after the aforementioned continuous classification step is carried out.

The problem of contaminating the water-absorbent resin powder with a trace amount of metallic foreign substance (or its powder) is not found in a production of a laboratory scale, but the problem is a particular problem in a production of a plant scale, and it tends to be remarkable particularly in a large plant. However, even in such a large plant, the present invention water-absorbent resin powder can easily be obtained according to the present invention production process for a water-absorbent resin powder. The objective production scale of the present invention is more favorably 750 kg/hr, most favorably 1,000 kg/hr per line. The larger the plant becomes, the more remarkable the problem of contaminating the water-absorbent resin powder with the metallic foreign substance (or its powder) is. This is because the present invention effect tends to be enhanced.

(Measurement Method of Metallic-Foreign-Substance Content):

As to the removing effect when the metallic foreign substance is removed from the crosslinked hydrogel polymer or its dried product in the present invention, the amount of the metallic foreign substance adhering to a magnetic-flux irradiation means such as a bar magnet may be measured. However, when it is necessary to practically measure the metallic-foreign-substance content in the water-absorbent resin powder, the metallic foreign substance may be separated from the crosslinked hydrogel polymer by using such as a metallic-foreign-substance separator as mentioned below.

Figure 1:
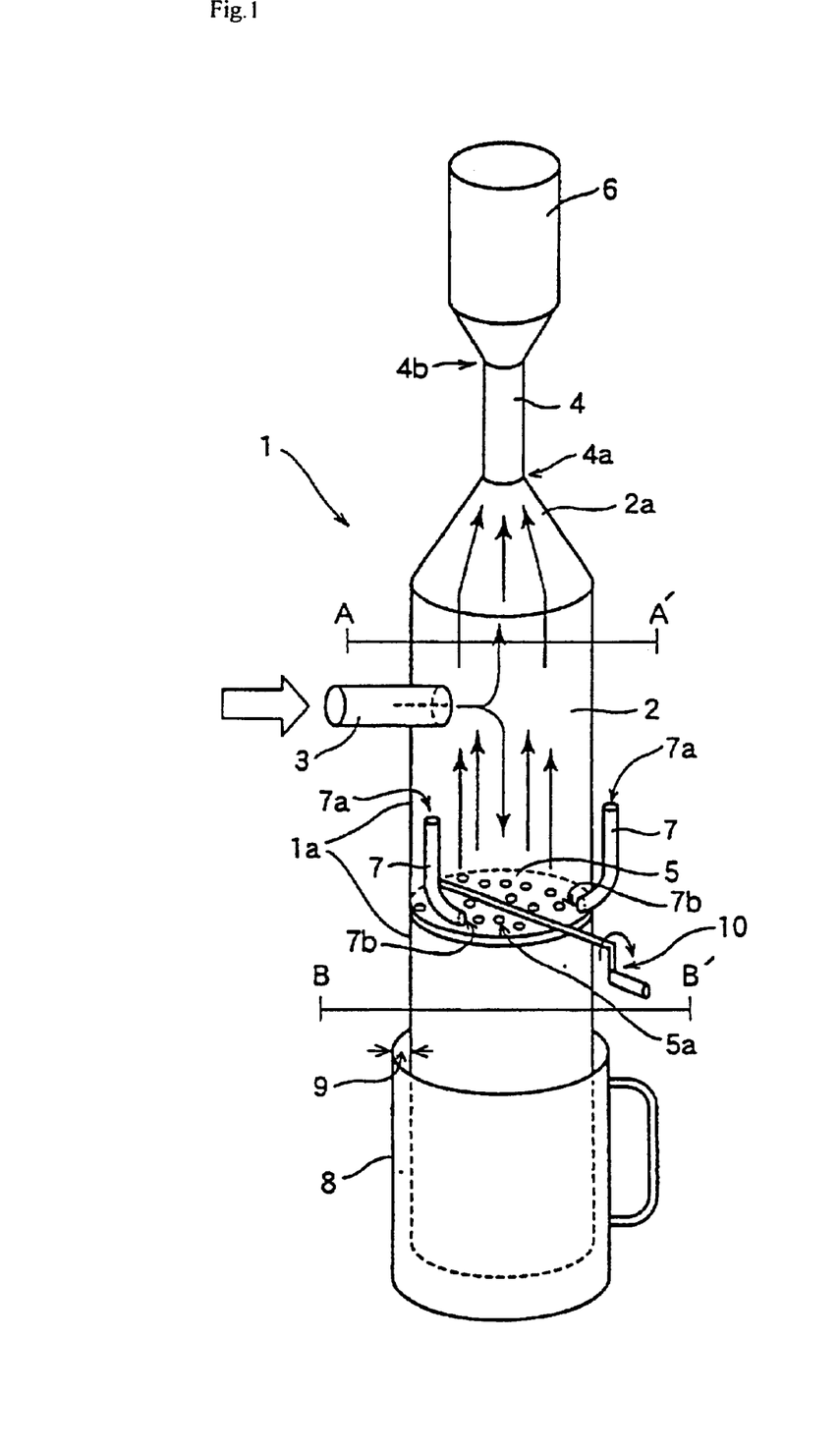
FIG. 1 is a schematic view of one example of the present invention metallic-foreign-substance separator.
Figure 2:
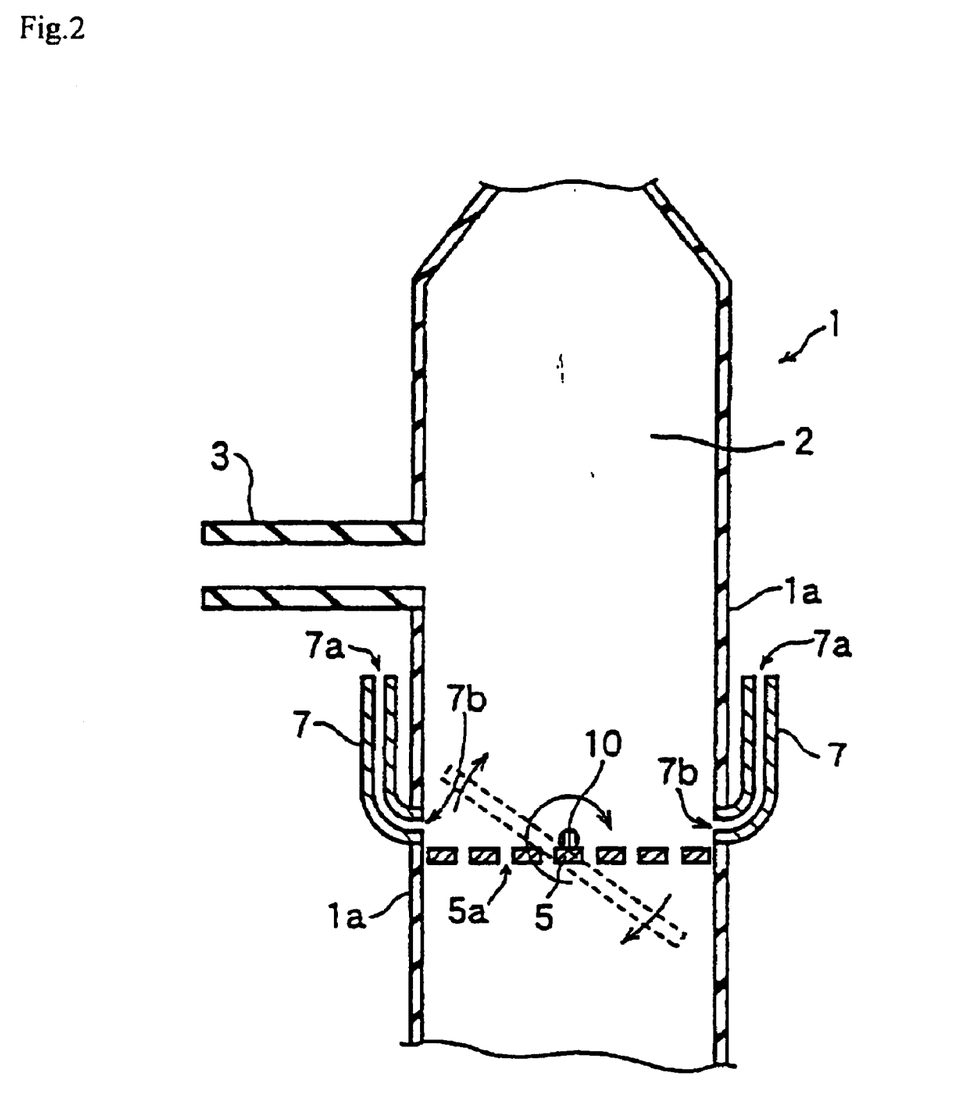
FIG. 2 is a schematic end sectional view showing one example of the present invention metallic-foreign-substance separator when a portion around a perforated plate 5 is magnified.

As is shown in FIG. 1 and FIG. 2 that is a partially magnified view of FIG. 1, the metallic-foreign-substance separator 1 is a metallic-foreign-substance separator comprising: a separating chamber 2 to form a space for stirring a metallic-foreign-substance-contaminated organic substance powder with an ascending air current; a substance inlet 3 for introducing the metallic-foreign-substance-contaminated organic substance powder into the separating chamber 2; a substance outlet 4 for exhausting and recovering the organic substance powder from the separating chamber 2 together with the ascending air current wherein the metallic foreign substance is separated from the organic substance powder; a perforated plate 5 which is the bottom of the separating chamber 2; and an air-current generator 6 that generates the ascending air current in the separating chamber 2 by aspirating an air from the substance outlet 4, and is a metallic-foreign-substance separator in which the organic substance powder as sampled is classified under a drying condition by the air current on the basis of its specific gravity, and the organic substance powder and the metallic foreign substance can be separated and recovered.

As to the substance inlet 3, there is no especial limitation on its shape. The substance inlet 3 may be an inlet portion where the metallic-foreign-substance-contaminated organic substance powder can be introduced into the separating chamber 2, but it favorably has such as a tube shape or a cylindrical shape in consideration of easiness of introduction.

As to the above introduction from the substance inlet 3 to the separating chamber 2, the metallic-foreign-substance-contaminated organic substance powder may be added for a short time, supplied continuously, or supplied intermittently. The introducing method is not especially limited to these.

As is mentioned above, the substance outlet 4 is directly or indirectly connected to the air-current generator 6 aspirating the air for generating the ascending air current in the separating chamber 2, and besides, it may be connected to such as: a capture portion or a capturing receptacle, in which the organic substance powder as recovered from the substance outlet 4 with the ascending air current is collected; and a valve that can adjust the air-current amount. The capture portion or capturing receptacle, and the valve may be arranged, for example, between the substance outlet 4 and the air-current generator 6, or next to the substance outlet 4 and the air-current generator 6, or they may be incorporated with the air-current generator 6.

When the aspirating force of the air-current generator 6 is adjusted, it can favorably be adjusted to such an extent that: the metallic-foreign-substance-contaminated organic substance powder as introduced from the substance inlet 3 into the separating chamber 2 is stirred by the ascending air current, and besides, the major part of the organic substance powder is aspirated up to the substance outlet 4, and the major part of the other such as the metallic foreign substance falls to the perforated plate 5 of the bottom of the separating chamber 2. Specifically, the linear velocity of the ascending air current as generated in the separating chamber 2 is favorably in the range of 1 to 10 m/s, more favorably 3 to 4 m/s, most favorably 3.4 m/s. However, it is not especially limited thereto. In the case where the above linear velocity is too fast or too slow, it is difficult to efficiently separate the organic substance powder from the metallic foreign substance.

The perforated plate 5 plays a part of further sieving the metallic foreign substance and other else which are separated in a form of falling without carrying on the ascending air current as generated in the separating chamber 2, among such as the organic substance powder and the metallic foreign substance as introduced from the substance inlet 3.

In FIGS. 1 and 2, an arrow as shown in the separating chamber 2 (except for an arrow from the substance inlet 3) shows the ascending air current as generated in the separating chamber 2, and the arrow from the substance inlet 3 shows a state such that the organic substance powder sample as introduced from the substance inlet 3 is mixed by the ascending air current, and then separated upper or lower.

(Effects and Advantages of the Invention):

According to the present invention, a water-absorbent resin powder, which is not contaminated with a metallic foreign substance and in which the promotion of the gel deterioration is suppressed, can be obtained. In addition, according to the present production process, the metallic foreign substance with which the water-absorbent resin powder is contaminated can be removed effectively and easily. In addition, the water-absorbent resin powder, which is not contaminated with the metallic foreign substance and in which the deterioration is suppressed, has excellent properties. Therefore, it can be utilized as a sanitary material.

DETAILED DESCRIPTION OF THE PREFERRED EMBODIMENTS

Hereinafter, the present invention is more specifically illustrated by the following examples and comparative examples. However, the invention is not limited to these examples. Incidentally, the various performances of the water-absorbent resins were measured by the following methods.

(1) Absorption Capacity Without Load (30 Minutes' Absorption Capacity Without Load for a 0.90 Mass % Physiological Saline/CRC)

Under conditions of a room temperature (20 to 25° C.) and a relative humidity of 50%, 0.200 g of water-absorbent resin was uniformly added to a nonwoven-fabric-made bag (60 mm×60 mm), and then the bag was sealed. Thereafter, the bag was immersed into a 0.9 mass % physiological saline at room temperature. The bag was pulled up after 30 minutes, and the mass (W1 (g)) of the bag was measured after draining water off at 250 G for 3 minutes with a centrifugal separator (produced by Kokusan Co., Ltd., centrifugal separator: model type H-122). In addition, the same procedure was carried out without using any water-absorbent resin or water-absorbing agent, and then the mass (W0(g)) of the bag was measured. Then, the absorption capacity (g/g) without load was calculated from these W0 and W1 in accordance with the following equation:

absorption capacity $(g/g)$ without load=$(W1(g)-W0(g))$/mass of water-absorbent resin $(g)$ (2) Extractable (Water-Extractable) Content:

In 1,000 g of deionized water which was added to a receptacle having a lid (inner diameter: 90 mm×200 mm), 500 mg of water-absorbent resin powder was dispersed, and they were stirred with a magnetic stirrer bar having a length of 4 cm at about 300 to 600 rpm for 16 hours. Thereafter, the resultant dispersing hydrogel liquid was filtrated with a filter paper (produced by ADVANTEC Toyo Co., Ltd., trade name: (JIS P 3801, No. 2), thickness: 0.26 mm, and diameter of captured particles: 5 µm), thus obtaining a filtrate.

Next, the filtrate as obtained was weighed out into a beaker of 100 ml, and then 1 ml of 1N aqueous sodium hydroxide solution (produced by Wako Pure Chemicals Co., Ltd.), 10 ml of 0.005 N aqueous methyl glycol chitosan solution (produced by Wako Pure Chemicals Co., Ltd.), and about 0.2 g of 0.1% toluidine blue (toluidine blue indicator, produced by Wako Pure Chemicals Co., Ltd.) were added to the above filtrate. Subsequently, the colloidal titration of the above beaker solution was carried out by using 0.0025N aqueous potassium polyvinyl sulfate solution (produced by Wako Pure Chemicals Co., Ltd.), and when the color of the solution is changed from blue to red purple is regarded as an end point, and the titration amount D (ml) was measured. In addition, the same procedure was carried out except for using 50 g of deionized water instead of the 50 g of the filtrate, thus measuring the titration amount E (ml).

Then, the extractable content (mass %) was calculated from these titration amounts and the average molecular weight F of monomers that the water-absorbent resin comprised, in accordance with the following equation:

extractable content (mass %)=$(E(ml)-D(ml))\times 0.005/C(g)\times F$ (3) Measurement of Gel Stability:

To begin with, the extractable content of the water-absorbent resin after deterioration was measured according to the below-mentioned deterioration-accelerating test.

Artificial urine (Jayco artificial urine) was prepared by dissolving 2.0 g of KCl, 2.0 g of $Na_2SO_4$, 0.85 g of $NH_4H_2PO_4$, 0.15 g of $(NH_4)_2HPO_4$, 0.1 g of $CaCl_2$, and 0.23 g of $MgCl_2$. Next, to a polypropylene receptacle of 100 ml in capacity (inner diameter: 55 mm) having a lid, 0.50 g of water-absorbent resin and 12.50 g of the aforementioned artificial urine were added in order, and the resultant swollen gel of 25 times was sealed in the above receptacle, and then the receptacle was left under an atmosphere of 60° C. for 16 hours.

After 16 hours, the entirety of the swollen gel was taken out, and it was added to 1 L of deionized water, and the resultant dispersing hydrogel liquid was filtrated with a filter paper (the filter paper of the above (2)) in the same way as of the above (2), thus obtaining a filtrate. Subsequently, the extractable content of the filtrate was calculated in accordance with the measurement of the extractable (water-extractable) content as mentioned in the above (2), and regarded as an extractable (water-extractable) content after deterioration.

The gel stability was calculated in accordance with the following equation. When the numeral value of the extractable content as increased by the deterioration-accelerating test is less, it means that the gel stability is higher.

gel stability (mass %)=extractable content after deterioration (mass %)−extractable content (mass %)

(4) Mass-Average Particle Diameter:

Water-absorbent resin powders were classified with JIS standard sieves having mesh opening sizes of such as 850 µm, 600 µm, 500 µm, 425 µm, 300 µm, 212 µm, 150 µm, 106 µm, and 75 µm, and then the percentages of the residues R on these sieves were plotted on logarithmic probability paper. Therefrom, the mass-average particle diameter (D50) was read.

Incidentally, as to the classifying method, 10.0 g of water-absorbent resin powder was added to JIS standard sieves (THE IIDA TESTING SIEVE having a diameter of 8 cm) under conditions of a room temperature (20 to 25° C.) and a relative humidity of 50%, and then it was classified with a sieve shaker (IIDA SIEVE SHAKER, TYPE: ES-65 type, SER. No. 0501) for 10 minutes.

(5) Measurement Method of Absorption Capacity Under a Load:

In accordance with methods as disclosed in the working examples portions of EP 0885917 and EP 0811636, the absorption capacity of water-absorbent resin powder in a physiological saline solution under a load of 50 g/cm² (about 4.93 kPa) was measured.

That is to say, while a load of 50 g/cm² was uniformly applied to 0.900 g of water-absorbent resin powder, the mass W2 (g) of the physiological saline solution as absorbed by the water-absorbent resin powder over a period of 60 minutes was measured with a balance. Then, the absorption capacity (g/g) under the load in 60 minutes from the absorption initiation was calculated from the above-mentioned W2 in accordance with the following equation, to determine the absorption capacity (g/g) under the load of 50 g/cm².

absorption capacity $(g/g)$ under a load=mass $W2(g)$/mass $(g)$ of water-absorbent resin powder (6) Saline Flow Conductivity for a 0.69 Mass % Physiological Saline (SFC):

The following test was carried out according to the saline flow conductivity (SFC) test as described in JP-A-509591/1997.

Figure 5:
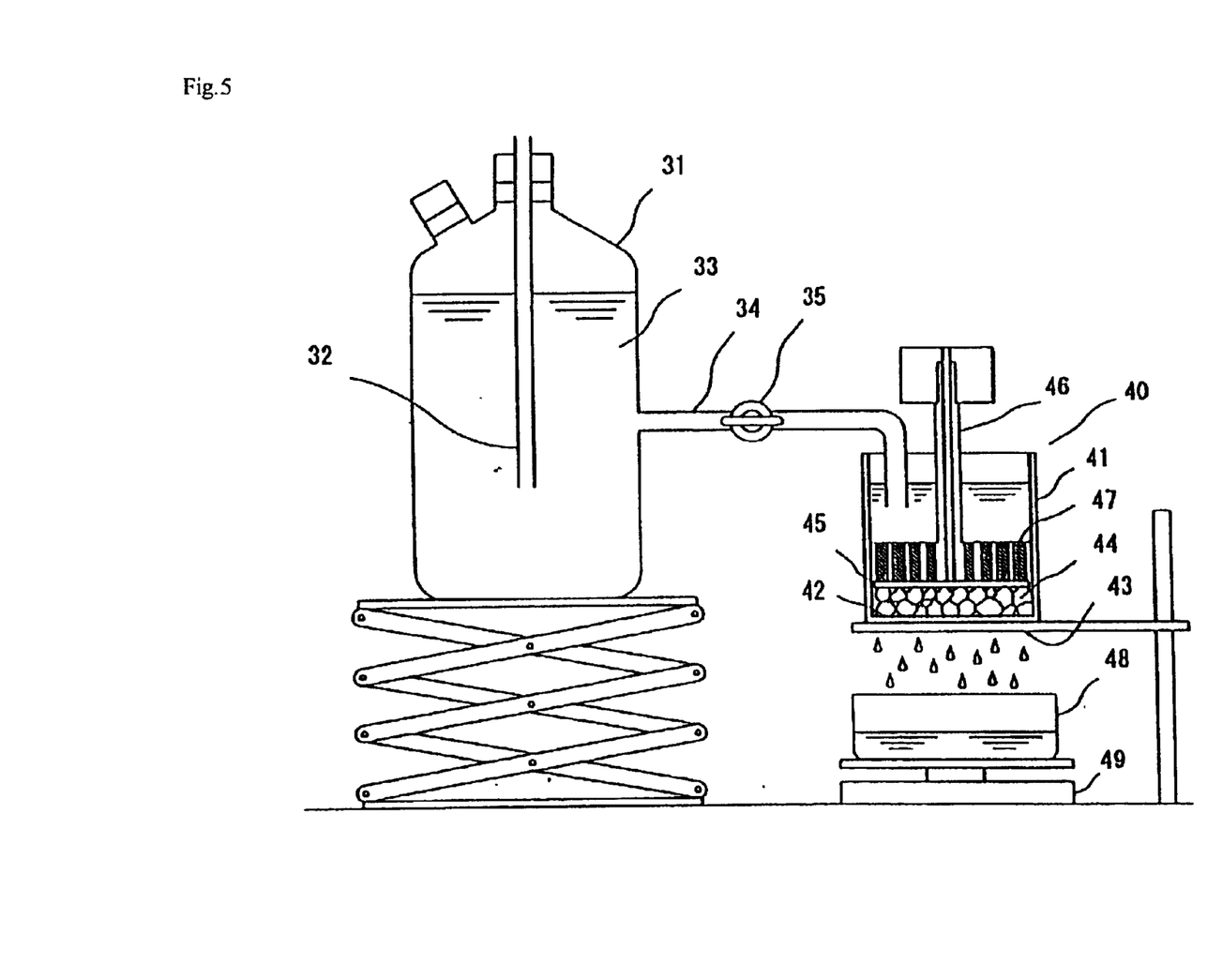
FIG. 5 is a schematic sectional view of a measurement apparatus as used for measuring the saline flow conductivity.

An apparatus as shown in FIG. 5 is used, and a water-absorbent resin powder (0.900 g) as uniformly added to a receptacle 40 is swollen in artificial urine (Jayco artificial urine as mentioned in the above (3)) for 60 minutes under a load of 0.3 psi (2.07 kPa), and the gel layer height of the resultant gel 44 is recorded. Next, under the load of 0.3 psi (2.07 kPa), a 0.69 mass % physiological saline 33 is passed through the swollen gel layer from a tank 31 under a constant hydrostatic pressure. This SFC test was carried out at room temperature (20 to 25° C.). The amount of the liquid passing through the gel layer versus time is recorded as a function to time with a computer and a balance at twenty seconds' intervals for 10 minutes. The flow rate through the swollen gel 44 (mainly between particles thereof), $F_s$ (t), is determined in a unit of g/s by dividing the incremental mass (g) by incremental time (s). The time when the constant hydrostatic pressure and the stable flow rate are obtained is regarded as $t_s$, and only the data collected for times between $t_s$ and 10 minutes are used for flow rate calculations. $F_s$ (t=0) value, namely, the initial flow rate through the gel layer, is calculated from the flow rate between $t_s$ and 10 minutes. $F_s$ (t=0) is calculated by extrapolating the results of a least-squares fit of $F_s$ (t) versus time to t=0.

$$\text{Saline flow conductivity} = (F_s(t=0) \times L_0)/(\rho \times A \times \Delta P)$$

$$= (F_s(t=0) \times L_0)/139{,}506$$

where:

$F_s$ (t=0): flow rate in g/sec;

$L_0$: initial thickness of gel layer in cm;

$\rho$: density of NaCl solution (1.003 g/cm$^3$);

A: area of the upper side of gel layer in the cell 41 (28.27 cm$^2$);

$\Delta P$: hydrostatic pressure applied to gel layer (4,920 dyne/cm$^2$); and the unit of the SFC value is: $10^{-7} \times \text{cm}^3 \times \text{s} \times \text{g}^{-1}$.

As to the apparatus as shown in FIG. 5, a glass tube 32 is inserted into the tank 31, and the lower end of the glass tube 32 was arranged so that the 0.69 mass % physiological saline 33 could be maintained at a height of 5 cm from the bottom of the swollen gel 44 in a cell 41. The 0.69 mass % physiological saline 33 in the tank 31 was supplied to the cell 41 through a L-tube 34 having a cock. A receptacle 48 to collect the passed liquid was arranged under the cell 41, and the collecting receptacle 48 was arranged on a balance 49. The inner diameter of the cell 41 was 6 cm, and a No. 400 stainless wire mesh 42 (mesh opening size of 38 μm) was arranged at the bottom thereof. Holes 47 sufficient for the liquid to pass through were opened in the lower portion of a piston 46, and its bottom portion was equipped with a permeable glass filter 45 so that the water-absorbing agent or its swollen gel would not enter the holes 47. The cell 41 was placed on a stand to put the cell thereon. The faces, coming in contact with the cell, of the stand were arranged on a stainless wire mesh 43 that did not inhibit liquid permeation.

(Production Example 1 of Water-Absorbent Resin Powder)

An aqueous partially neutralized sodium acrylate solution, which included 0.02 mol % of trimethylolpropane triacrylate (crosslinking agent) and had a neutralization ratio of 75 mol % (concentration: 38 mass %), was prepared as an aqueous monomer solution (1). The aqueous monomer solution (1) as obtained was continuously fed with a metering pump at a rate of 2,630 kg/hr, and a nitrogen gas was continuously blown in the middle of piping so as to adjust the oxygen concentration to not more than 0.5 ppm. Sodium persulfate/L-ascorbic acid (ratio: 0.12/0.005 (g/monomer mol)) was further blended with the aqueous monomer solution (1), and the resultant mixture was supplied to a flat steel belt having a dam at its sides so that the thickness of the mixture would be about 25 mm, and then the aqueous polymerization was continuously carried out for 30 minutes. The crosslinked hydrogel polymer (1) as obtained in this way was pulverized, and thereafter divided into small pieces having a diameter of about 1 mm with a meat chopper having a die diameter of 7 mm. This resultant pulverized gel was thinly spread and put on a porous plate of a band dryer, and continuously hot-wind-dried at 180° C. for 30 minutes. The resultant dry polymer was disintegrated, and the resultant particulate dried product was pulverized by continuously supplying it to a three-stage roll granulator (roll setting gap: 1.0 mm/0.55 mm/0.42 mm in order from the top) at a rate of 1,000 kg/h. Thereafter, the resultant powder was classified with a sieving machine having metal gauzes with mesh opening sizes of 850 μm and 150 μm, thus obtaining a water-absorbent resin powder (1) including particles having particle diameters of 850 to 150 μm in a ratio of not less than 90 mass %.

Furthermore, the water-absorbent resin powder (1) was continuously supplied to a high-speed continuous blender (Turbulizer/1,000 rpm) at a rate of 1,000 kg/h, and then was spraywise blended with an aqueous surface-crosslinking agent solution including glycerin, water, and isopropanol in ratios of 0.5, 2.0 and 0.5 (mass % relative to absorbent resin) respectively by a spray which could form liquid drops of about 250 μm. Subsequently, the resultant mixture was continuously heat-treated at 195° C. for 40 minutes with a paddle dryer, and thereafter the resultant heated powder was further classified with a sieving machine having a metal gauze with a mesh opening size of 850 μm, thus obtaining a water-absorbent resin (1A) as a passing product.

Results of various properties of the water-absorbent resin (1A) as obtained were listed in Table 1.

(Production Example 2 of Water-Absorbent Resin Powder)

A crosslinked hydrogel polymer (2) was obtained by carrying out the same polymerization as of Example 1 except for using an aqueous partially neutralized sodium acrylate solution which included 0.03 mol % of trimethylolpropane triacrylate and had a neutralization ratio of 75 mol % (concentration: 38 mass %), and thereafter the drying and pulverization were similarly carried out, thus obtaining a water-absorbent resin (2).

Furthermore, the water-absorbent resin (2) was blended with an aqueous surface-crosslinking agent solution including glycerin, water, and isopropanol in ratios of 0.5, 2.0 and 0.5 (mass % relative to absorbent resin) respectively in a high-speed continuous blender in the same way as of Example 1. Subsequently, the resultant mixture was continuously heat-treated at 195° C. for 40 minutes with a paddle dryer, and thereafter the resultant heated powder was further classified with a sieving machine having a metal gauze with a mesh opening size of 850 μm, thus obtaining a water-absorbent resin (2A) as a passing product.

Results of various properties of the water-absorbent resin (2A) as obtained were listed in Table 1.

(Production Example 3 of Water-Absorbent Resin Powder)

A crosslinked hydrogel polymer (2) was obtained by carrying out the same polymerization as of Example 1 except for using an aqueous partially neutralized sodium acrylate solution which included 0.02 mol % of polyethylene glycol diacrylate and had a neutralization ratio of 75 mol % (concentration: 38 mass %), and thereafter the drying and pulverization were similarly carried out, thus obtaining a water-absorbent resin (3).

Furthermore, the water-absorbent resin (3) was blended with an aqueous surface-crosslinking agent solution including ethylene glycol diglycidyl ether, propylene glycol, water, and isopropanol in ratios of 0.05, 1.0, 3.0 and 0.5 (mass % relative to absorbent resin) respectively in a high-speed continuous blender in the same way as of Example 1. Subsequently, the resultant mixture was continuously heat-treated at 195° C. for 40 minutes with a paddle dryer, and thereafter the resultant heated powder was further classified with a sieving machine having a metal gauze with a mesh opening size of 850 μm, thus obtaining a water-absorbent resin (3A) as a passing product.

Results of various properties of the water-absorbent resin (3A) as obtained were listed in Table 1.

COMPARATIVE EXAMPLES 1 TO 3

In the examples, the water-absorbent resin powders were not treated with the above magnets, and they were directly supplied to the end-product hopper.

Water-absorbent-resin stability tests were carried out by using comparative water-absorbent resin powders (1B) to (3B) as obtained. The results were listed in Table 2.

TABLE 2

| Water-absorbent resin powder | Gel stability (mass %) |
|---|---|
| 1B | 3.2 |
| 2B | 1.0 |
| 3B | 2.4 |
| Comparative 1B | 7.2 |
| Comparative 2B | 5.7 |
| Comparative 3B | 6.7 |

Note:
Various properties as shown in Table 1 are omitted because they substantially had no changes.

As is shown in Table 2, the water-absorbent resin powders (1B) to (3B) as obtained by treating the water-absorbent resin powders (1A) to (3A) with the magnetic flux are particularly superior in the gel stability to the comparative

TABLE 1

| Water-absorbent resin | Absorption capacity without load (g/g) | Absorption capacity under a load (g/g) | Extractable content (mass %) | SFC* | Average particle diameter (μm) | Ratio of particles having particle diameters of not larger than 150 μm (mass %) |
|---|---|---|---|---|---|---|
| 1 | 44 | 8 | 18 | Not more than 1 | 360 | 5.0 |
| 2 | 40 | 8 | 9 | Not more than 1 | 420 | 4.8 |
| 3 | 42 | 9 | 10 | Not more than 1 | 430 | 4.3 |
| 1A | 33 | 20 | 18 | 2 | 360 | 4.3 |
| 2A | 26 | 25 | 9 | 30 | 420 | 3.2 |
| 3A | 32 | 25 | 8 | 5 | 420 | 3.1 |

*Unit: $10^{-7} \times cm^3 \times s \times g^{-1}$

The present invention was carried out by using the water-absorbent resin powders (1A) to (3A) as obtained in the above production examples.

EXAMPLES 1 TO 3

The water-absorbent resin powders (1A) to (3A) as obtained in Production Examples 1 to 3 were continuously transferred pneumatically (1,000 kg/hr), and the magnets as shown in FIG. 3 (natural bar magnets, magnetic flux density: 1.2 Wb/m², and pitch: 30 mm) were arranged at a pipe outlet. The water-absorbent resin powders as transferred were contacted with the magnets (magnetic flux), and thereafter they were supplied to an end-product hopper. Incidentally, after the above procedures were finished, a very trace amount of metallic foreign substances (major component: powder or needle, several mm to 0.001 mm, particularly 0.01 to 1 mm, material quality: stainless steel) was fixed on the magnets, and they were metals derived from contacting faces between the water-absorbent resin powder and the plant.

Water-absorbent-resin stability tests were carried out by using the water-absorbent resin powders (1B) to (3B) as obtained. The results were listed in Table 2.

water-absorbent resin powders (1B) to (3B) as obtained by not treating the same water-absorbent resin powders (1A) to (3A) with the magnetic flux. Furthermore, when being observed by such as a microscope, the comparative water-absorbent resin powders (1B) to (3B) contained a trace amount of fine metallic foreign substance (mainly 0.01 to 1 mm). On the other hand, the water-absorbent resin powders (1B) to (3B) contained no metallic foreign substance, and they are superior in sanitation.

EXAMPLE 4

Figure 4:
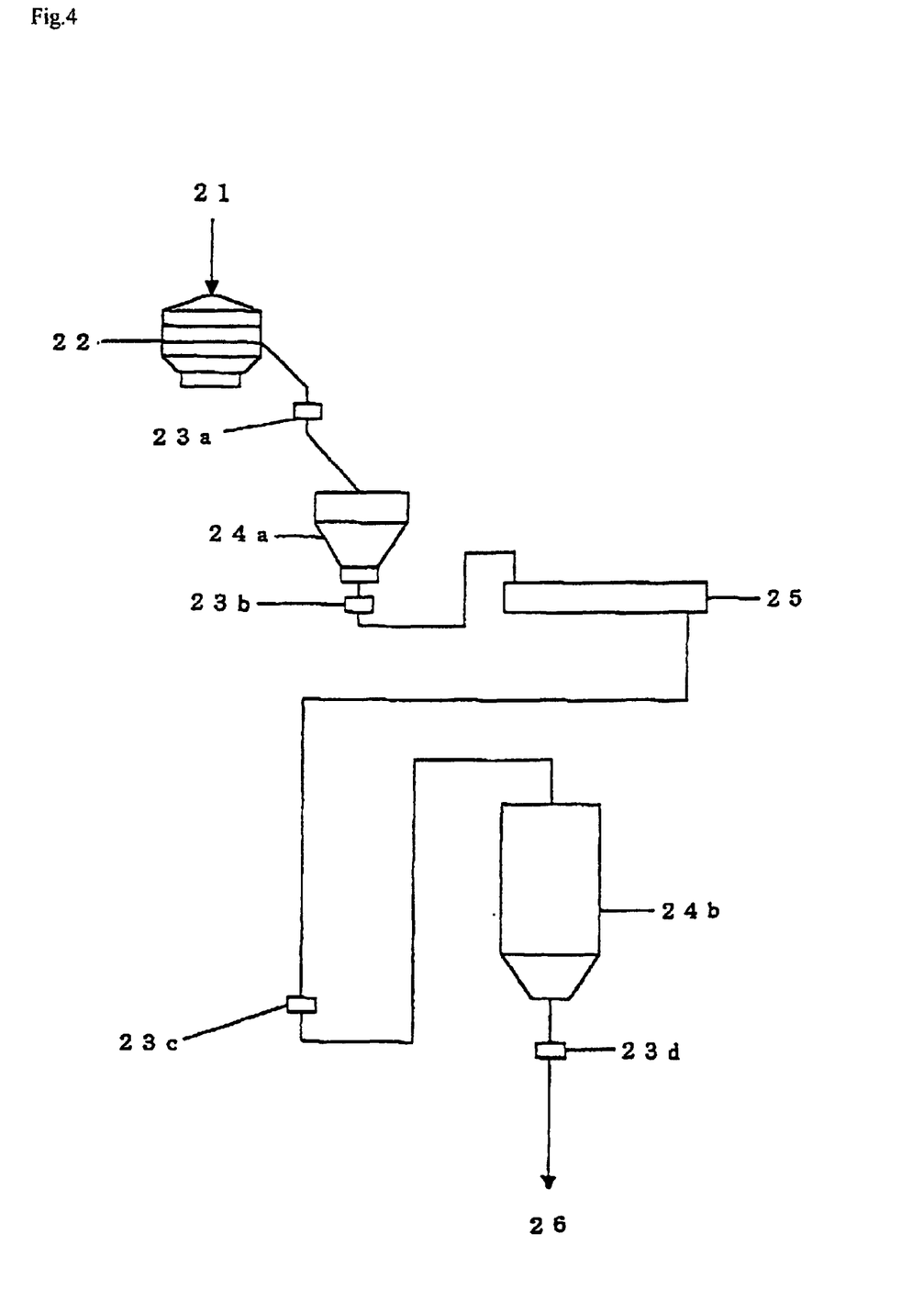
FIG. 4 is a flow chart around the metallic-foreign-substance separator (iron-removing apparatus) in the present invention.

To 100 kg of the water-absorbent resin (1) as obtained in Production Example 1, 1 g of metal powder having particle diameters of 1 to 100 μm was added, and they were passed through a flow as shown in FIG. 4 under conditions as shown in Table 3. Incidentally, the surface-treatment condition as carried out is the same condition as of Production Example 1. The stability of the water-absorbent resin was evaluated by using the water-absorbent resin powder (4B) as obtained. Results as obtained are listed in Table 3. In addition, when the metal recovery ratio was calculated in accordance with the following equation, it was 100%.

metal recovery ratio=(metal powder as recovered by magnets (g))×100/(metal powder as added (g))

EXAMPLE 5

A procedure was carried out in the same way as of Example 4 except for not passing through a metallic-foreign-substance separator (iron-removing apparatus 1) and a metallic-foreign-substance separator (iron-removing apparatus 2). Then, the metal recovery ratio was 99%, and the stability of the water-absorbent resin was evaluated by using the water-absorbent resin powder (5B) as obtained. Results as obtained are listed in Table 3.

EXAMPLE 6

A procedure was carried out in the same way as of Example 5 except that: the feeding amount was changed to 1.0 t/hr; the distance of the magnets (natural bar magnets) of the metallic-foreign-substance separator was changed to 12.5 mm; and the pitch was changed to 36.0 mm. The stability of the water-absorbent resin was evaluated by using the water-absorbent resin powder (6B) as obtained. Results as obtained are listed in Table 3.

EXAMPLE 7

A procedure was carried out in the same way as of Example 6 except that: the distance was changed to 25.0 mm; and the pitch was changed to 50.0 mm. The stability of the water-absorbent resin was evaluated by using the water-absorbent resin powder (7B) as obtained. Results as obtained are listed in Table 3.

EXAMPLE 8

A procedure was carried out in the same way as of Example 7 except for not passing through a metallic-foreign-substance separator (iron-removing apparatus 3). The stability of the water-absorbent resin was evaluated by using the water-absorbent resin powder (8B) as obtained. Results as obtained are listed in Table 3.

EXAMPLE 9

A procedure was carried out in the same way as of Example 8 except for removing a dispersing plate. The stability of the water-absorbent resin was evaluated by using the water-absorbent resin powder (9B) as obtained. Results as obtained are listed in Table 3.

COMPARATIVE EXAMPLE 4

A procedure was carried out in the same way as of Example 4 except for passing through none of the metallic-foreign-substance separators. Then, the metal recovery ratio was 0%, and the stability of the water-absorbent resin was evaluated by using the comparative water-absorbent resin powder (comparative 4B) as obtained. Results as obtained are listed in Table 3.

COMPARATIVE EXAMPLE 5

A procedure was carried out in the same way as of Example 6 except for passing through none of the metallic-foreign-substance separators. Then, the metal recovery ratio was 0%, and the stability of the water-absorbent resin was evaluated by using the comparative water-absorbent resin powder (comparative 5B) as obtained. Results as obtained are listed in Table 3.

TABLE 3

|  |  | Example 4 | Example 5 | Example 6 | Example 7 | Example 8 | Example 9 | Comparative Example 4 | Comparative Example 5 |
|---|---|---|---|---|---|---|---|---|---|
| Magnetic flux density | (Wb/m$^2$) | 1.2 | 1.2 | 1.2 | 0.9 | 0.9 | 0.9 | — | — |
| Distance | (mm) | 8.0 | 8.0 | 12.5 | 25.0 | 25.0 | 25.0 | — | — |
| Pitch | (mm) | 32.0 | 32.0 | 36.0 | 50.0 | 50.0 | 50.0 | — | — |
| Lattice number | (piece) | 3 | 3 | 3 | 2 | 2 | 2 | — | — |
| Dispersing plate |  | Used | Used | Used | Used | Used | Not used | — | — |
| Feeding | (t/h) | 1.2 | 1.2 | 1.0 | 1.0 | 1.0 | 1.0 | 1.2 | 1.0 |
| Arrangement | (place) | 4 | 2 | 2 | 2 | 1 | 1 | — | — |
| Water-absorbent resin powder |  | 4B | 5B | 6B | 7B | 8B | 9B | Comparative 4B | Comparative 5B |
| Gel stability | (mass %) | 0.4 | 0.5 | 0.7 | 1.5 | 3.6 | 5.2 | 12.1 | 11.4 |

What is claimed is:

1. A production process for a water-absorbent resin powder, which comprises the steps of: polymerizing an unsaturated monomer; and drying the resultant crosslinked hydrogel polymer, wherein the water-absorbent resin powder has a crosslinked structure and a mass-average particle diameter of 300 to 600 $\mu$m wherein the ratio of fine particles having particle diameters of not larger than 150 $\mu$m is less than 10 mass % of the water-absorbent resin powder, with the production process being characterized by further comprising a magnetic-flux irradiation step of passing a magnetic field having a magnetic flux density of not less than 0.05 Wb/m$^2$ through the water-absorbent resin powder after the drying step in the production process.

2. A production process for a water-absorbent resin powder according to claim 1, which, after the drying step, further comprises a pulverization step, a classification step, and continuous transferring steps of connecting the steps of the production process to each other, wherein the magnetic-flux irradiation step is included after the classification step.

3. A production process for a water-absorbent resin powder according to claim 2, wherein the irradiation of the magnetic flux is carried out in at least two places on the continuous transferring steps, and wherein one of the at least two places is located just upstream of a hopper for storing an end product of the water-absorbent resin powder.

4. A production process for a water-absorbent resin powder according to claim 1, wherein the magnetic flux is a magnetic flux having a magnetic flux density of not less than 1.0 Wb/m$^2$.

5. A production process for a water-absorbent resin powder according to claim 1, wherein the magnetic-flux irradiation step is provided with a permanent magnet and/or an electromagnet.

6. A production process for a water-absorbent resin powder according to claim 5, wherein: the magnets are arranged in the shape of a lattice and its lattice interval is set in the range of 5 to 30 mm.

7. A production process for a water-absorbent resin powder according to claim 6, wherein the lattice including the magnets is arranged at least double in a direction of transferring the water-absorbent resin powder.

8. A production process for a water-absorbent resin powder according to claim 6, wherein the pitch between the magnets is set in the range of 10 mm to 60 mm.

9. A production process for a water-absorbent resin powder according to claim 1, wherein the load to the production line is so large as to continuously produce the water-absorbent resin powder at a productivity of not less than 500 kg/hr per line.

10. A production process for a water-absorbent resin powder according to claim 1, wherein not less than 50% of faces, contacting the water-absorbent resin powder, of apparatuses as used for the production line are stainless steel faces.

11. A production process for a water-absorbent resin powder according to claim 1, wherein the crosslinked hydrogel polymer is a product obtained by a process including the steps of: carrying out shearing polymerization and/or static polymerization to obtain a crosslinked hydrogel polymer; and then dividing the resultant crosslinked hydrogel polymer into small pieces.

12. A production process for a water-absorbent resin powder according to claim 1, which further comprises the step of surface-crosslinking the resultant dried product of the crosslinked hydrogel polymer at 150 to 250° C.

13. A production process for a water-absorbent resin powder according to claim 1, which further comprises the step of drying the crosslinked hydrogel polymer wherein this drying step is carried out on a punched metal.

14. A production process for a water-absorbent resin powder according to claim 2, wherein at least a portion of the continuous transferring steps is carried out by pneumatic transferring.

15. A water-absorbent resin powder, of which the major proportion is comprised of a polymer that is obtained by a process including the step of polymerizing a monomer including acrylic acid and/or its salt in a major proportion, and which has a mass-average particle diameter of 300 to 600 $\mu$m wherein the ratio of fine particles having particle diameters of not larger than 150 $\mu$m is less than 10 mass % of the water-absorbent resin powder, and which has a crosslinked structure and is irradiated with a magnetic flux.

16. A sanitary material, comprising a water-absorbent resin powder of which the major proportion is comprised of a polymer that is obtained by a process including the step of polymerizing a monomer including acrylic acid and/or its salt in a major proportion, and which has a mass-average particle diameter of 300 to 600 $\mu$m wherein the ratio of fine particles having particle diameters of not larger than 150 $\mu$m is less than 10 mass % of the water-absorbent resin powder, and which has a crosslinked structure and is irradiated with a magnetic flux.

* * * * *